(12) United States Patent
Cook

(10) Patent No.: US 10,018,796 B1
(45) Date of Patent: Jul. 10, 2018

(54) OPTICAL FIBER RIBBON ASSEMBLIES WITH IMPROVED RIBBON STACK COUPLING

(71) Applicant: Superior Essex International LP, Atlanta, GA (US)

(72) Inventor: Thomas Christopher Cook, Woodstock, GA (US)

(73) Assignee: Superior Essex International LP, Atlanta, GA (US)

( * ) Notice: Subject to any disclaimer, the term of this patent is extended or adjusted under 35 U.S.C. 154(b) by 12 days.

(21) Appl. No.: 15/612,419

(22) Filed: Jun. 2, 2017

(51) Int. Cl.
*G02B 6/44* (2006.01)

(52) U.S. Cl.
CPC .......... *G02B 6/4403* (2013.01); *G02B 6/443* (2013.01)

(58) Field of Classification Search
USPC ........................................ 385/114
See application file for complete search history.

(56) References Cited

U.S. PATENT DOCUMENTS 9,594,224 B2 * 3/2017 Baucom .................. G02B 6/44

* cited by examiner

*Primary Examiner* — Eric Wong

(57) ABSTRACT

Fiber optic ribbon assemblies having improved ribbon stack coupling are described. A fiber optic ribbon assembly may include a buffer tube and an optical fiber ribbon stack extending within the buffer tube. Additionally, at least one friction inducing component may be helically wrapped around the optical fiber ribbon stack along a longitudinal direction with gaps between longitudinally adjacent sections.

20 Claims, 6 Drawing Sheets

OPTICAL FIBER RIBBON ASSEMBLIES WITH IMPROVED RIBBON STACK COUPLING

TECHNICAL FIELD

Embodiments of the disclosure relate generally to optical fiber ribbon cables and, more specifically, to dry optical fiber ribbon cables having enhanced coupling between a ribbon stack and buffer tube.

BACKGROUND

Fiber optic cables are utilized in a wide variety of applications, such as applications in which optical signals are utilized to transmit data. Certain types of fiber optic cables include optical fibers that are incorporated into ribbons, and a plurality of ribbons may be formed into a ribbon stack. In a typical cable, ribbons and ribbon stacks are positioned within a buffer tube that protects the optical fibers. Within a tube, some relative movement should be permitted between the optical fibers and the tube to accommodate bending of a cable; however, it is desirable to limit the movement of the optical fibers to prevent displacement and/or damage to the optical fibers. In other words, there may be movement of optical fiber ribbons and/or ribbon stacks independent of a buffer tube that exceeds a desired amount of movement flexibility.

Certain conventional optical fiber cables fill buffer tubes with thixotropic materials that provide cushioning for the optical fibers and limit undesirable movement. However, it is often desirable to eliminate these thixotropic materials from cables in order to provide "dry" cables. Other cable designs incorporate longitudinally continuous tapes or other wraps that serve to cushion the optical fibers within a tube. However, these wraps are continuously wrapped around an entire circumference of the optical fibers along a longitudinal direction and increase an amount of material incorporated into a cable, thereby increasing cable weight and overall cost. Indeed, there is an opportunity for improved fiber optic ribbon assemblies that limit movement of optical fibers within a buffer tube or other suitable sheath by enhancing coupling between an optical fiber ribbon and/or ribbon stack and the sheath. Additionally, there is an opportunity for improved friction inducing components that enhance coupling between a buffer tube (or other sheath) and a fiber optic ribbon or ribbon stack.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
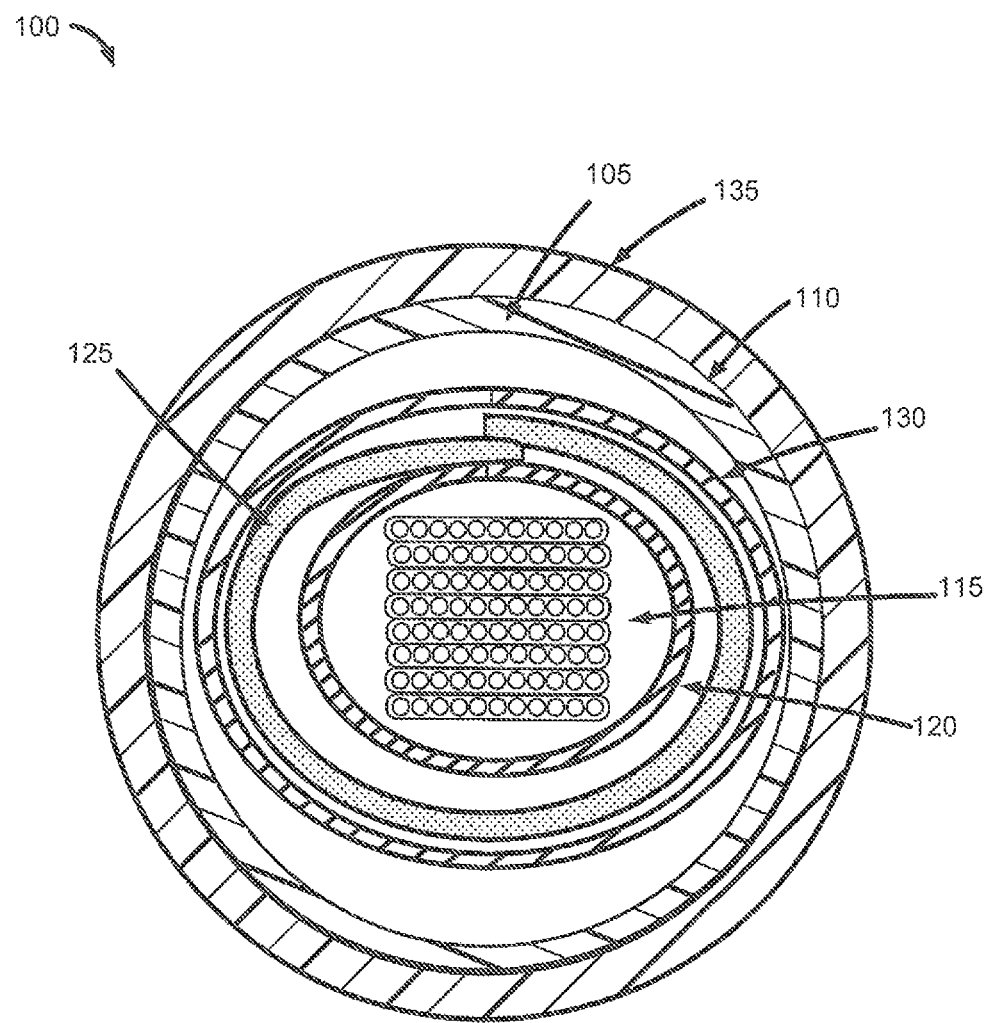
FIGS. 1-3 are cross-sectional views of example cables that incorporate fiber optic ribbon assemblies having one or more friction inducing components, according to illustrative embodiments of the disclosure.

Various embodiments of the present disclosure are directed to fiber optic ribbon assemblies and fiber optic cables in which one or more friction inducing components enhance coupling between an optical fiber ribbon or ribbon stack and a suitable buffer tube or other sheath. As a result, undesirable movement of the optical fibers within the buffer tube may be reduced and/or maintained below a desirable threshold. In one example embodiment, a fiber optic ribbon assembly or a cable may include a buffer tube and an optical fiber ribbon stack longitudinally extending within the buffer tube. Additionally, at least one friction inducing component may be helically wrapped around the ribbon stack along a longitudinally direction with a suitable lay length that facilitates the formation or provision of gaps between longitudinally adjacent sections. In other words, a friction inducing component may be wrapped such that it does not completely encircle the ribbon stack at any given cross-sectional point along its longitudinal length. As a result, the friction inducing component may be formed as a relatively inexpensive, relatively lightweight, and/or reduced material component relative to conventional buffer tube coupling elements.

As desired, a suitable water blocking layer may additionally be incorporated into a buffer tube. For example, a water blocking layer may be wrapped around a ribbon stack in order to inhibit water migration within the buffer tube and/or to cushion the optical fibers. In certain embodiments, the friction inducing component may be positioned between the ribbon stack and the water blocking layer. In other embodiments, the friction inducing component may be positioned between the water blocking layer and the buffer tube. In yet other embodiments, a fiber optic ribbon assembly may include a first friction inducing component positioned between the ribbon stack and the water blocking layer and a second friction inducing component positioned between the water blocking layer and the buffer tube.

A friction inducing component may be formed with a wide variety of suitable constructions. For example, a friction inducing component may be formed as a string, a tape, or as a tube. Additionally, a friction inducing component may be formed with any number of suitable layers and/or with a wide variety of suitable dimensions, such as any suitable diameter, width, cross-sectional area, etc. A friction inducing component may also be formed from a wide variety of suitable materials and/or combinations of materials. For example, a friction inducing component may be formed from or may include one or more suitable elastomeric materials, one or more rubber materials, or other suitable materials suitable for enhancing coupling between an optical fiber ribbon stack and a buffer tube (and/or any intervening layers). Additionally, a friction inducing component may have any suitable Coefficient of Friction ("COF"), such as a COF of at least approximately 0.40. According to an aspect of the disclosure, a friction inducing component may have a COF that is greater than its adjacent materials within a fiber optic ribbon assembly, such as a buffer tube and a ribbon stack.

Further, any suitable number of friction inducing components may be incorporated into a fiber optic ribbon assembly as desired in various embodiments. As set forth above, in certain embodiments, respective friction inducing components may be positioned on either side of a water blocking layer. In other embodiments, a plurality of friction inducing components may be helically twisted around a ribbon stack (or other component of a ribbon assembly). For example, at least two friction inducing components may be helically wrapped around a ribbon stack. In certain embodiments, each of the friction inducing components may be wrapped in the same direction (e.g., a clockwise direction, a counter clockwise direction, etc.), for example, with offset lays. In other embodiments, at least two friction inducing components may be wrapped in opposite directions. Additionally, in certain embodiments, each friction inducing component may have a similar construction and/or dimensions. In other embodiments, at least two friction inducing components may have different constructions and/or dimensions. For example, two friction inducing components may have a different cross-sectional shape, number of layers, width, lay length, etc. As another example, two friction inducing components may be formed from different materials and/or have different COFs. Indeed, a wide variety of suitable combinations of friction inducing components may be utilized in order to control the COF and/or coupling between a ribbon stack and buffer tube.

Certain example embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Example Cable Constructions

Figure 2:
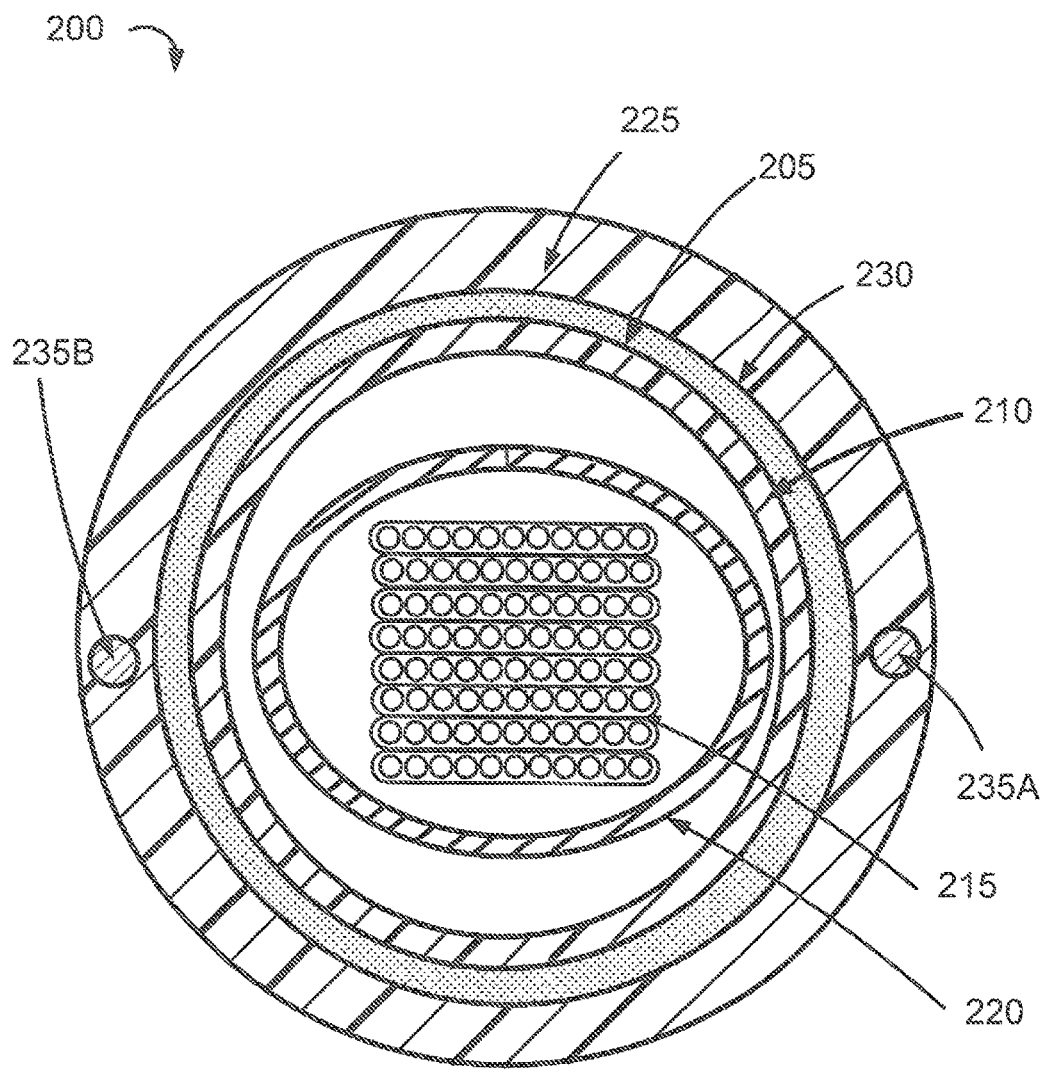
Figure 3:
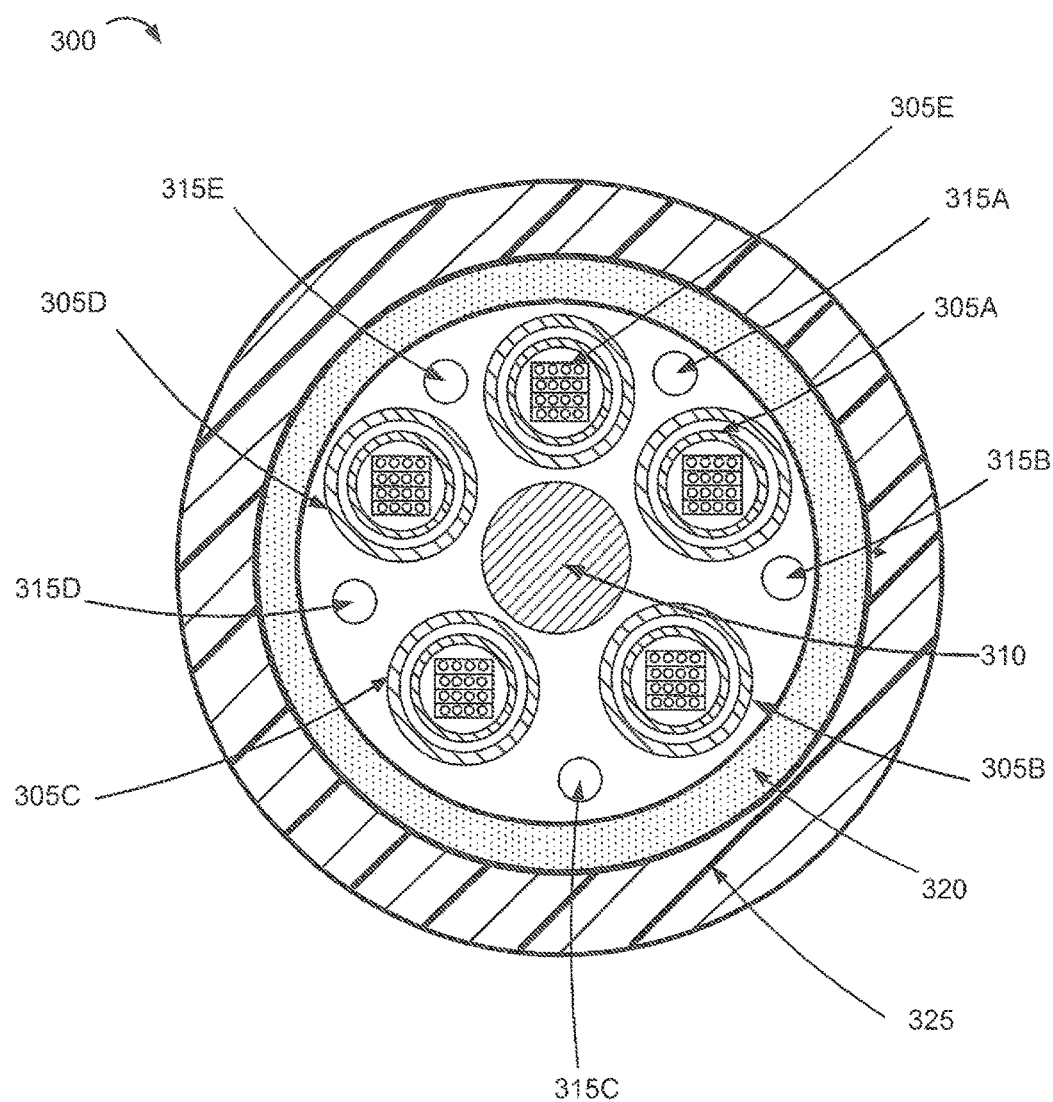

FIGS. 1-3 illustrate cross-sectional views of example cable constructions that incorporate fiber optic ribbon assemblies having one or more friction inducing components. The described cables are provided by way of non-limiting example only, and it will be appreciated that a wide variety of other suitable cable constructions may be formed in addition to those described. Further, the fiber optic ribbon assemblies described in conjunction with the example cable constructions are provided by way of non-limiting example only. A wide variety of other types of fiber optic ribbon assemblies may incorporate one or more friction inducing components in accordance with embodiments of the disclosure.

Turning now to FIG. 1, a cross-sectional view of an example optical fiber cable 100 is illustrated. The illustrated cable 100 may have a single fiber optic ribbon assembly 105 that includes a buffer tube 110 with a plurality of optical fibers arranged in a ribbon stack 115 positioned within the buffer tube 110. Additionally, at least one friction inducing component may be positioned within the buffer tube 110. For example, as illustrated, a first friction inducing component 120 may be positioned between the ribbon stack 115 and a water blocking layer 125 wrapped around the ribbon stack 115. A second friction inducing component 130 may then be positioned between the water blocking layer 125 and the buffer tube 110. Each friction inducing component 120, 130 may facilitate improved coupling between the ribbon stack 115 and an inner surface of the buffer tube 110.

With continued reference to FIG. 1, an outer jacket 135 may be formed around the fiber optic ribbon assembly 105. As illustrated in FIG. 2, a water blocking layer and/or a strength layer may be formed between the buffer tube 110 and the outer jacket 135 as desired in certain embodiments. In other cable designs, such as the cable illustrated in FIG. 3, a plurality of fiber optic ribbon assemblies may be incorporated into a cable. Indeed, the example cable 100 of FIG. 1 may include a wide variety of additional components. Each of the components of the cable 100 are described in greater detail below.

The outer jacket 135 may define an outer periphery of the cable 100. The jacket 135 may enclose the internal components of the cable 100, seal the cable 100 from the environment, and provide strength and structural support. The jacket 135 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, chlorosulfonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. As desired, the jacket 120 may also include flame retardant materials, smoke suppressant materials, carbon black or other suitable material for protection against exposure to ultraviolet ("UV") light, and/or other suitable additives. The jacket 135 may include a single layer or, alternatively, multiple layers of material (i.e., multiple layers of the same material, multiple layers of different materials, etc.). As desired, the jacket 135 may be characterized as an outer sheath, a casing, a circumferential cover, or a shell.

The jacket 135 may enclose one or more openings in which other components of the cable 100, such as the fiber optic ribbon assembly 105, are disposed. At least one opening enclosed by the jacket 135 may be referred to as a cable core, and any number of other cable components may be disposed in a cable core. In the cable 100 illustrated in FIG. 1, the optical fiber ribbon assembly 105 may be situated within a cable core. A wide variety of other components may be situated within a cable core as desired, such as other ribbon assemblies, other transmission media, tight buffered optical fibers, various separators or dividers, spacers, inner jackets or wraps, etc. Indeed, a wide variety of different cable constructions may be utilized in accordance with various embodiments of the disclosure.

Additionally, the illustrated cable 100 has a circular or approximately circular cross-sectional profile. In other embodiments, other cross-sectional profiles (e.g., an elliptical or oval profile, etc.) and/or dimensions may be utilized as desired. In other words, the jacket 135 may be formed to result in any desired shape. The jacket 135 may also have a wide variety of dimensions, such as any suitable or desirable outer diameter and/or any suitable or desirable wall thickness. Additionally, in certain embodiments, the cable profile may be formed to facilitate a specific function and/or to facilitate installation of the cable. For example, a cable profile may facilitate duct or conduit installation, and the cable 100 may be designed to withstand a specified installation tensile loading and/or other suitable design parameters. In certain embodiments, at least one "ripcord" may be incorporated into the cable 100, for example, within a cable core. A ripcord may facilitate separating the jacket 135 from other components of the cable 100. In other words, the ripcord may help open the cable 100 for installation or field service. A technician may pull the ripcord during installation in order to access internal components of the cable 100. As desired and illustrated in FIG. 2, any number of strength members, an armor layer, and/or water swellable materials may also be incorporated into the cable 100.

The fiber optic ribbon assembly 105 may include a buffer tube 110 or other suitable sheath configured to house a ribbon stack 115 or other plurality of optical fibers. The buffer tube 110 may be formed from any suitable materials or combinations of materials. Examples of suitable materials include, but are not limited to, various polymers or polymeric materials, acrylate or acrylics (e.g., acrylic elastomers, etc.), polyvinyl chloride ("PVC"), polyurethane, a fluoropolymer, polyethylene, neoprene, polyvinylidene fluoride ("PVDF"), polybutylene terephthalate ("PBT"), ethylene, plastic, or other appropriate materials or combinations of suitable materials. Additionally, the buffer tube 110 may be formed as either a single layer or a multiple layer buffer tube. In the event that multiple layers are utilized, the layers may all be formed from the same material(s) or, alternatively, at least two layers may be formed from different materials or combinations of materials. For example, at least two layers may be formed from different polymeric resins. As another example, a flame retarding or other suitable additive may be incorporated into a first layer but not into a second layer. Further, the buffer tube 110 may have any suitable inner and/or outer diameters as desired in various applications. For example, the buffer tube 110 may be appropriately sized to house a given ribbon stack 115.

The ribbon stack 115 may include any suitable arrangement of a plurality of optical fibers. For example, optical fibers may be formed or incorporated into a plurality of different ribbon arrangements that are stacked on top of one another to form a ribbon stack. As another example, optical fibers may be formed into one or more ribbon arrangements that are folded or otherwise manipulated into a stacked configuration. As yet another example, optical fibers may be arranged in one or more ribbons that each include intermittent, spaced, or spiderweb-type bonding that permits the ribbons to be bundled, rolled, and/or otherwise formed into a desired arrangement. Regardless of the number and/or types of ribbons utilized, each ribbon may include any suitable number of optical fibers that are bonded or otherwise joined together. In certain embodiments, a plurality of ribbons may each include the same number of fibers. For example, a 144 count ribbon stack may be formed from twelve ribbons having twelve fibers each. In other arrangements, at least two ribbons may include different numbers of optical fibers. In yet other embodiments, a plurality of loose or bundled optical fibers may be utilized as a ribbon stack. Indeed, a wide variety of suitable arrangements of one or more ribbons may be utilized to form a ribbon stack 115. As desired, a ribbon stack 115 may be helically or S-Z stranded.

Any number of optical fibers may be incorporated into a ribbon and/or a ribbon stack 115 as desired. Each optical fiber may be a single mode fiber, multi-mode fiber, puremode fiber, polarization-maintaining fiber, multi-core fiber, or some other optical waveguide that carries data optically. Additionally, each optical fiber may be configured to carry data at any desired wavelength (e.g., 1310 nm, 1550 nm, etc.) and/or at any desired transmission rate or data rate. The optical fibers may also include any suitable composition and/or may be formed from a wide variety of suitable materials capable of forming an optical transmission media, such as glass, a glassy substance, a silica material, a plastic material, or any other suitable material or combination of materials. Each optical fiber may also have any suitable cross-sectional diameter or thickness. In certain embodiments, an optical fiber may include a core that is surrounded by a cladding. Additionally, one or more suitable coatings may surround the cladding.

In certain embodiments, when a plurality of optical fibers are arranged into a ribbon stack 115, certain optical fibers may be arranged in accordance with predetermined macrobending ("MAC") numbers. For example, an optical fiber positioned at a corner of the ribbon stack 115 may have a predetermined MAC number that inhibits optical attenuation of the corner fiber when subjected to compressive forces. In other words, a corner fiber may have a MAC number that results in the fiber being less sensitive o optical attenuation when the cable 100 is compressed.

With continued reference to FIG. 1, in certain embodiments, a water blocking layer 125 may be positioned within the buffer tube 110 and wrapped around the ribbon stack 115. As desired, the water blocking layer 125 may include a wide variety of suitable components and/or constructions. For example, the water blocking layer 125 may be formed as a water blocking tape (e.g., a tape having water blocking material attached to a suitable substrate layer, etc.), as one or more water blocking yarns, and/or as any number of other suitable water blocking elements. Additionally, the water blocking layer 125 may include any number of suitable water blocking materials, such as super absorbent polymers ("SAP") and/or other suitable materials. In certain embodiments, the water blocking layer 125 may be formed as a relatively continuous layer that is wrapped around the ribbon stack 115. In other words, the water blocking layer 125 may be wrapped around, enclose, or entrap the ribbon stack 115 along a longitudinal length of the cable 100. In other embodiments, the water blocking layer 125 may include a plurality of discrete components that are intermittently wrapped, partially wrapped, or otherwise positioned about the ribbon stack 115 at any number of desired locations (e.g., a plurality of spaced locations, in a relatively continuous manner, etc.) along a longitudinal length of the cable 100. Indeed, a wide variety of suitable water blocking arrangements may be incorporated into a fiber optic ribbon assembly 105.

Additionally, in accordance with an aspect of the disclosure, at least one friction inducing component may be helically wrapped around the ribbon stack 115. For example, as shown in FIG. 1, a first friction inducing component 120 may be helically wrapped around the ribbon stack 115 between the ribbon stack 115 and the water blocking layer 125. A second friction inducing component 130 may then be wrapped around the water blocking layer 125 and any underling components. The one or more friction inducing components 120, 130 may enhance or promote coupling between the ribbon stack 115 and an inner surface of the buffer tube 110. As a result, undesirable movement of the ribbon stack 115 and/or optical fibers within the buffer tube may be reduced and/or maintained below a desirable threshold.

Each friction inducing component (generally referred to as friction inducing component 120) may be helically wrapped around the ribbon stack 115 and/or any intervening components, such as the water blocking layer 125. A friction inducing component 120 may be helically wrapped along a longitudinally direction of the ribbon stack 115 with any suitable lay length. The lay length may be a longitudinal length required for the friction inducing component 120 to make one complete twist around the ribbon stack 115. For example, a friction inducing component 120 may be wrapped with a lay length of approximately 5, 10, 15, 20, 25, 30, 35, 40, 45, 50, 60, 70, 75, 80, 90, 100, 110, 120, 125, 130, 140, 150, 160, 170, 175, 180, 190, or 200 cm, a lay length incorporated into a range between any two of the above values (e.g., a lay length between approximately 10 cm and approximately 100 cm), or a lay length bounded on either a minimum or maximum end by one of the above values. In certain embodiments, the lay length of a friction inducing component 120 may facilitate the formation or provision of gaps between longitudinally adjacent sections of the friction inducing component 120. In other words, the friction inducing component 120 may not overlap itself along one or more widthwise edges as it is helically wrapped. Stated in another way, the friction inducing component 120 may be wrapped such that it does not completely encircle the ribbon stack at any given cross-sectional point along its longitudinal length. As a result, the friction inducing component 120 may be formed as a relatively inexpensive, relatively lightweight, and/or reduced material component relative to conventional buffer tube coupling elements.

A friction inducing component 120 may be formed with a wide variety of suitable constructions. In certain embodiments, a friction inducing component 120 may be formed as a suitable string, yarn, cord, thread, or other suitable line. For example, a relatively slender string or cord may be utilized as a friction inducing component. In other embodiments, a friction inducing component 120 may be formed as a suitable tape or strip-like layer. For example, a friction inducing component 120 may be formed as a relatively flat tape. In yet other embodiments, a friction inducing component 120 may be formed as a tube, hollow structure, or other structure including one or more internal channels and/or cavities extending at least partially along a longitudinal length. A few example constructions are described in greater detail below with reference to FIGS. 5A-5C. A wide variety of other suitable constructions may be utilized as desired, and these constructions may each have a wide variety of suitable cross-sectional shapes.

A friction inducing component 120 may also be formed from and/or may incorporate a wide variety of suitable friction inducing materials and/or combinations of materials. For example, a friction inducing component 120 may be formed from or may include one or more unsaturated rubbers (e.g., natural polyisoprene, synthetic polyisoprene, polybutadiene rubber, chloroprene rubber, butyl rubber, styrene-butadiene rubber, nitrile rubber, etc.), one or more saturated rubbers (ethylene propylene rubber, epichlorohydrin, polyacrylic rubber, silicone rubber, fluorosilicone rubber, fluoroelastomers, perfluoroelastomers, polyether block amides, chlorosulfonated polyethylene, ethylene-vinyl acetate, etc.), latex, thermoplastic elastomers, ethylene propylene rubber, polysulfide rubber, elastolefin, any other suitable rubber and/or elastomeric materials, and/or any other suitable materials suitable for enhancing coupling between the ribbon stack 115 and the buffer tube 110 (and/or any intervening components).

Additionally, a friction inducing component 120 may have any suitable Coefficient of Friction ("COF"), such as a COF of at least approximately 0.40. In other embodiments, a friction inducing component may have a COF of approximately 0.40, 0.50, 0.60, 0.70, 0.80, or 0.90, a COF incorporated into a range between any two of the above values, or a COF incorporated into a range bounded on either a minimum or maximum end by one of the above values. According to an aspect of the disclosure, a friction inducing component may have a COF that is greater than its adjacent materials within a fiber optic ribbon assembly 105, such as the buffer tube 110, the ribbon stack 115, and/or the water blocking layer 125.

Additionally, regardless of the overall construction, a friction inducing component 120 may be formed with any number of suitable layers. For example, a friction inducing component 120 may be formed as a rubberized yarn, a friction element coated thread or string, a latex or rubber tube, or with any other suitable constructions. In certain embodiments, a friction inducing component 120 may be formed from a single layer or as a relatively solid or uniform component. For example, a single layer of a friction inducing material may be utilized. As another example, friction inducing material may be embedded into a base or carrier layer (e.g., a polymeric base layer, etc.). In other embodiments, a friction inducing component 120 may include a plurality of layers. For example, a layer of friction inducing material may be adhered, affixed, or otherwise attached to a base or carrier layer. As desired, a wide variety of suitable materials other than friction inducing materials may be incorporated into a friction inducing component 120. For example, a base or carrier layer may be formed from any number of suitable polymeric materials (e.g., polypropylene, polyethylene, etc.), water blocking materials, non-woven materials, or other suitable materials. A few non-limiting examples of layer constructions that may be utilized for a friction inducing component 120 are described in greater detail below with reference to FIGS. 6A-6C.

A friction inducing component 120 may also be formed with a wide variety of suitable dimensions. For example, a string may be formed with any suitable diameter, cross-sectional area, and/or cross-sectional shape (e.g., circular, elliptical, etc.). In certain embodiments, a string may have a diameter of approximately 0.5, 1.0, 1.5, 2.0, 2.5, or 3.0 mm, a diameter incorporated into a range between any two of the above values, or a diameter incorporated into a range bounded on either a minimum or maximum end by one of the above values. As another example, a tape may be formed with any suitable width, thickness, cross-sectional area, and/or cross-sectional shape (e.g., rectangular, square, trapezoidal, etc.). In certain embodiments, a tape may have a width of approximately 1, 2, 3, 5, 7, 8, 10, 12, 15, 18, 20, 22, or 25 mm, a width incorporated into a range between any two of the above values, or a width incorporated into a range bounded on either a minimum or maximum end by one of the above values. Additionally, in certain embodiments, a tape may have a thickness of approximately 0.5, 1.0, 1.5, 2.0, 2.5, 3.0, or 3.5 mm, a thickness incorporated into a range between any two of the above values, or a thickness incorporated into a range bounded on either a minimum or maximum end by one of the above values. As yet another example, a tube may have any suitable outer diameter, inner diameter, cross-sectional area, and/or cross-sectional shape (e.g., circular, elliptical, etc.). In certain embodiments, a tube may have an inner diameter and/or an outer diameter having a value similar to the example values discussed above for a string diameter. A wide variety of other suitable dimensions may be utilized as desired for various friction inducing components.

In certain embodiments, one or more dimensions of a friction inducing component 120 may be selected in order to provide a desired COF and/or a desired amount of coupling between components of the fiber optic ribbon assembly 105. Similarly, an amount of friction inducing material incorporated into a friction inducing component 120 may be selected or optimized in order to provide a desired COF and/or amount of coupling. For example, an amount of friction inducing material embedded into a carrier layer or attached to a base or substrate layer may be optimized to provide desired coupling.

Figure 4A:
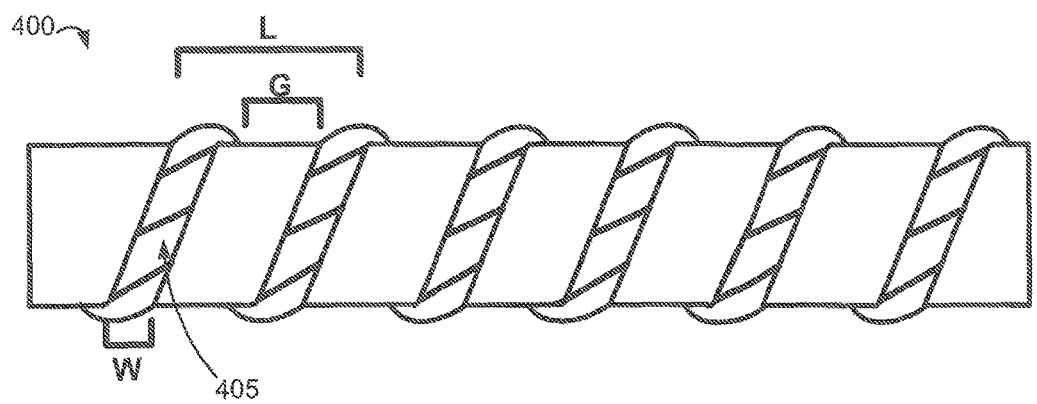
FIGS. 4A-4C are side views of example friction inducing components that are helically wound around a fiber optic ribbon stack, according to illustrative embodiments of the disclosure.
Figure 4B:
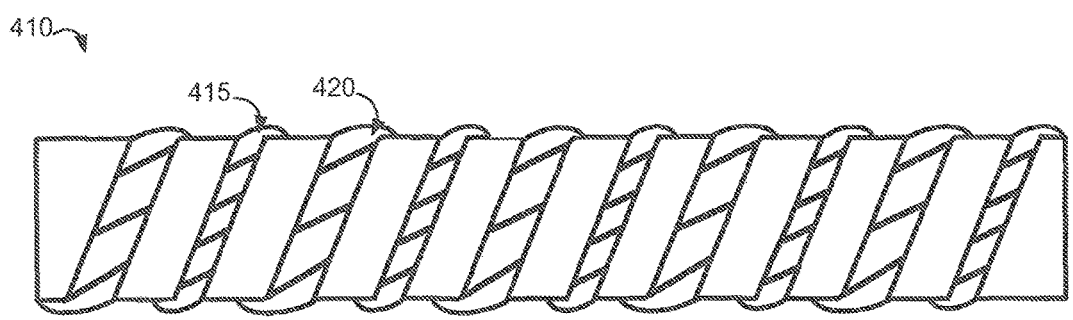
Figure 4C:
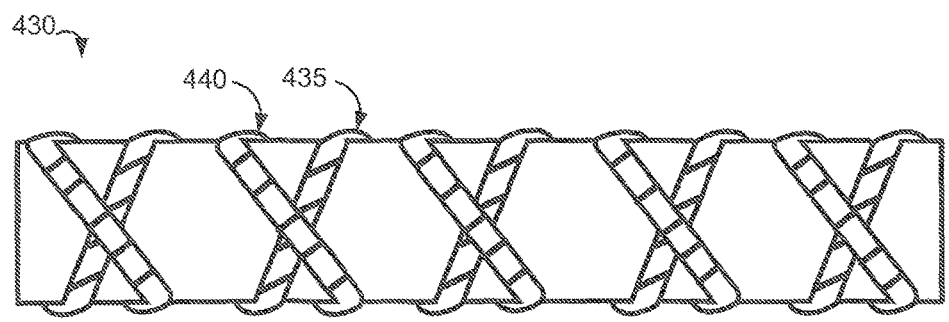

Additionally, any suitable number of friction inducing components may be incorporated into a fiber optic ribbon assembly 105 as desired in various embodiments. For example, as shown in FIG. 2, a single friction inducing component may be utilized. As another example, as illustrated in FIG. 1, respective friction inducing components 120, 130 may be positioned on either side of a water blocking layer 125. Further, in certain embodiments, a plurality of friction inducing components may be helically wrapped around specific components of a fiber optic ribbon assembly 105. For example, a plurality of distinct, discrete, and/or separate friction inducing components may be helically wrapped around a ribbon stack 115 and positioned between the ribbon stack and the water blocking layer 125. As another example, a plurality of distinct, discrete, and/or separate friction inducing components may be helically wrapped around the water blocking layer 125. FIGS. 4B and 4C depict longitudinal side views of example ribbon stacks or other fiber optic ribbon assembly components having a plurality of distinct friction inducing components helically wrapped thereon. Similar arrangements may be incorporated into the example fiber optic ribbon assemblies of FIGS. 1-3, which illustrate cross-sectional views of cables.

In certain embodiments, a plurality of friction inducing components may be helically wrapped in the same direction (e.g., a clockwise direction, a counter clockwise direction, etc.). For example, as illustrated in FIG. 4B, a plurality of friction inducing components may be helically wrapped around a ribbon stack in the same direction with offset lays. In other embodiments, at least two friction inducing components may be wrapped in opposite directions. Additionally, in certain embodiments, each of a plurality of friction inducing components, such as components 120, 130 (or a plurality of friction inducing components wrapped around the same component of a fiber optic ribbon assembly 105) may have a similar construction and/or dimensions. In other embodiments, at least two friction inducing components may have different constructions and/or dimensions. For example, a first friction inducing component may be formed as a tape while a second friction inducing component is formed as a tape or a string. As another example, two friction inducing components may have a different number of layers and/or concentration of friction inducing material. As yet another example, two friction inducing components may have different cross-sectional shapes, diameters, widths, thicknesses, lay lengths, and/or any other suitable dimensions. As yet another example, two friction inducing components may be formed from different materials and/or may have different COFs. Indeed, a wide variety of suitable combinations of friction inducing components may be utilized in order to control the COF and/or coupling between a ribbon stack and buffer tube.

As a result of incorporating one or more friction inducing components (e.g., components 120, 130, etc.) into a fiber optic ribbon assembly, the coupling between a fiber optic ribbon stack 115 (or other plurality of optical fibers) and a buffer tube 110 may be enhanced or promoted. Accordingly, undesirable movement of the optical fibers within the buffer tube 110 may be reduced and/or maintained below a desirable threshold. Additionally, in certain embodiments, the fiber optic ribbon assembly 105 may be formed as a relatively dry assembly. In other words, the fiber optic ribbon assembly 105 may be devoid of thixotropic gels, oils, lubes, and/or similar fillers.

FIG. 2 depicts a cross-sectional view of another example cable 200 that incorporates a fiber optic ribbon assembly having one or more friction inducing components, according to an illustrative embodiment of the disclosure. Similar to the cable 100 of FIG. 1, the cable 200 may include a fiber optic ribbon assembly 205 that includes a buffer tube 210 with a plurality of optical fibers arranged in a ribbon stack 215 positioned within the buffer tube 210. Additionally, at least one friction inducing component may be positioned within the buffer tube 210. For example, a friction inducing component 220 may be positioned between the ribbon stack 215 and the buffer tube 210. Additionally, a jacket 225 may be formed around the fiber optic ribbon assembly 205. Each of these components may be similar to the corresponding components discussed above with reference to FIG. 1.

Additionally, a water blocking layer and/or a strength layer 230 may be formed between the buffer tube 210 and the outer jacket 225 as desired in certain embodiments. For example, a water swellable tape or wrap may be positioned in a cable core and wrapped around the fiber optic ribbon assembly 205. In other embodiments, one or more water swellable yarns, strength yarns, and/or other suitable components may be wrapped around the fiber optic ribbon assembly 205. In certain embodiments, a water blocking layer, water blocking yarns, and/or other water blocking material may be incorporated into the fiber optic ribbon assembly 205 in a similar manner as that described above with reference to FIG. 1. As desired in various embodiments, water swellable materials may be provided in a continuous or discontinuous manner along a longitudinal length of the cable 200. Additionally or alternatively, water blocking material (e.g., water blocking dams) may be intermittently incorporated into the cable 200. A wide variety of suitable water blocking materials and/or combinations of materials may be utilized as desired. Upon contact with water, water swellable materials may absorb the water and swell, helping to prevent the water from damaging the optical fibers. Impeding the longitudinal flow of water also helps confine any fiber damage to facilitate repair. Accordingly, water dams may help to limit water damage.

In certain embodiments, the cable 200 may include an armor (not shown) inside or encompassed within the jacket 225. The armor may provide mechanical (e.g., rodent resistance, etc.) and/or electrical protection for transmission media situated within the cable core. The armor may be formed from a wide variety of suitable materials, such as a metal (e.g., steel, a copper alloy, etc.) tape that is formed into a tube, fiberglass, glass, epoxy, and/or appropriate polymeric materials. In certain embodiments, the armor may be formed as an interlocking armor or a corrugated armor. Additionally, an armor may be formed as a single layer armor or alternatively an armor may have multiple layers.

With continued reference to FIG. 2, in certain embodiments, one or more strength members may be incorporated into the cable 200 at a wide variety of suitable locations. In certain embodiments, one or more strength members 235A, 235B may be embedded in the jacket 225. For example, the jacket 225 may be formed or extruded around one or more strength members 235A, 235B. Embedded strength members 235A, 235B may be located at any desired points within the jacket 225. For example, the strength members 235A, 235B may be located on opposing lateral sides of a longitudinal axis of the cable 200. The strength members 235A, 235B may enhance tensile strength of the cable 200. In other embodiments, one or more strength members may be situated within a cable core. Indeed, a wide variety of strength member configurations may be utilized.

FIG. 3 is a cross-sectional view of another example cable 300 that incorporates one or more fiber optic ribbon assemblies having one or more friction inducing components, according to an illustrative embodiment of the disclosure. The cable 300 of FIG. 3 may include certain components that are similar to the cables 100, 200 of FIGS. 1 and 2; however, the cable 300 of FIG. 3 may include a plurality of fiber optic ribbon assemblies rather than a single assembly. As shown, a plurality of fiber optic ribbon assemblies 305A-E may be situated around a central strength member 210. Although five ribbon assemblies 305A-E are illustrated, any number of ribbon assemblies can be utilized. In other embodiments, the ribbon assemblies 305A-E may be situated around a central tube, a central group of twisted pairs, a central ribbon assembly, or other central cable component(s)). Additionally, although a single ring or layer of ribbon assemblies 305A-E is illustrated, in other embodiments, multiple rings or concentric layers of ribbon assemblies may be utilized. As desired, one or more of the ribbon assemblies 305A-E may be replaced with other components, such as strength members or spacers. Indeed, a wide variety of suitable ribbon assembly arrangements may be utilized.

Each of the fiber optic ribbon assemblies 305A-E may be situated within a cable core. The ribbon assemblies 305A-E may be loosely positioned within the core or, alternatively, stranded or twisted together. Each of the ribbon assemblies 305A-E may include similar components as the ribbon assemblies discussed above with reference to FIGS. 2 and 3. Additionally, in certain embodiments, one or more water blocking components, such as water blocking yarns 315A-E and/or a water blocking tape 320 or wrap may also be positioned within the cable core. An outer jacket 325 may then be formed around the internal cable components, and the outer jacket 325 may define the cable core (or multiple cores).

The cables 100, 200, 300 illustrated in FIGS. 1-3 are provided by way of example only to illustrate a few cable constructions that may incorporate one or more fiber optic ribbon assemblies with friction inducing components. A wide variety of other components may be incorporated into a cable as desired in other embodiments. For example, a cable may include an internal wrap or jacket, a binding layer, a wide variety of suitable transmission media, a wide variety of different types of tubes, spacers, strength members, water blocking materials, water swellable materials, insulating materials, dielectric materials, flame retardants, flame suppressants or extinguishants, gels, fillers, and/or other materials. Additionally, a cable may be designed to satisfy any number of applicable cable standards. These standards may include various operating environment requirements (e.g., temperature requirements), signal performance requirements, burn testing requirements, etc.

Example Friction Inducing Components

As set forth above, a fiber optic ribbon assembly (e.g., fiber optic ribbon assemblies 105, 205, 305 illustrated in FIGS. 1-3) may include one or more friction inducing components that are helically wrapped around a ribbon stack, water blocking layer, or other component. FIGS. 4A-4C are side views of example friction inducing components that are helically wrapped around a fiber optic ribbon stack, according to illustrative embodiments of the disclosure. Each of the example ribbon stacks and friction inducing components of FIGS. 4A-4C may be incorporated into any suitable fiber optic ribbon assembly, such as any of the assemblies 105, 205, 305 illustrated in FIGS. 1-3. Additionally, although FIGS. 4A-4C illustrate friction inducing components that are helically wrapped or wound around a ribbon stack, it will be appreciated that friction inducing components may similarly be helically wrapped around a water blocking layer or other components of a fiber optic ribbon assembly.

With reference to FIG. 4A, a longitudinal side view of a first example fiber optic ribbon stack 400 is illustrated. A friction inducing component 405 may be helically wound or wrapped around the ribbon stack 400 along the longitudinal direction. The friction inducing component 405 may be helically wrapped with any suitable lay length "L", such as any of the lay lengths discussed above with reference to FIG. 1. Additionally, in accordance with an aspect of the disclosure, the friction inducing component 405 may be wrapped such that a suitable gap "G" or space is present between longitudinally adjacent sections or wrapping of the friction inducing component 405. Any suitable gaps may be formed between adjacent sections or wrappings, such as a gap of approximately 10 mm. In other embodiments, gaps of approximately 2, 4, 5, 6, 8, 10, 12, 14, 16, 18, 20, 25, 30, 35, 40, 45, or 50 mm, a gap incorporated into a range between any two of the above values, or a gap incorporated into a range bounded on either a minimum or maximum end by one of the above values may be utilized. Additionally, a friction inducing components 405 may be helically wound at any suitable angle relative to the longitudinal direction, such as an angle of approximately 15, 20, 25, 30, 35, 40, 45, 50, 55, or 60 degrees, an angle incorporated into a range between any two of the above values, or an angle incorporated into a range bounded on either a minimum or maximum end by one of the above values.

Further, as explained in greater detail above with reference to FIG. 1, the friction inducing component 405 may be formed with a wide variety of suitable dimensions. For example, the friction inducing component 405 may have any suitable width "W", such as any of the widths discussed above with reference to FIG. 1. In other embodiments, the friction inducing component 405 may be formed with any suitable diameter, cross-sectional area, thickness, and/or other suitable dimensions. Additionally, one or more dimensions of the friction inducing component 405, an amount of friction inducing material incorporated into the friction inducing component 405, lay length, and/or angle of wrapping may be selected in order to achieve a desired COF or amount of coupling between the ribbon stack 400 and another component (e.g., a buffer tube, etc.) of an optical fiber ribbon assembly.

FIG. 4B illustrates a longitudinal side view of a second example fiber optic ribbon stack 410. A first friction inducing component 415 may be helically wound or wrapped around the ribbon stack 410 along the longitudinal direction. Additionally, a second friction inducing component 420 may be helically wound or wrapped around the ribbon stack 410 along the longitudinal direction. As shown, both the first and second friction inducing components 415, 420 are helically wrapped in the same direction. For example, both components 415, 420 may be wrapped in a clockwise or counter clockwise manner. Additionally, each of the friction inducing components 415, 420 may be wrapped with any suitable lay length. In certain embodiments, the two components 415, 420 may have lay lengths that are approximately equal to one another. However, as desired in certain embodiments and illustrated in FIG. 4B, the lays of the two friction inducing components 415, 420 may be offset from one another such that the components 415, 420 do not overlap.

In other embodiments, the two components 415, 420 may have different lay lengths and the components 415, 420 may overlap at any number of locations along the longitudinal length. Additionally, as shown, each of the friction inducing components 415, 420 may be helically wrapped such that gaps or spaces are formed between longitudinally adjacent sections or wrappings.

Additionally, each of the friction inducing components 415, 420 may be formed with any suitable constructions and/or dimensions. In certain embodiments, the two components 415, 420 may have similar constructions and/or dimensions. In other embodiments, the two components may have different constructions and/or one or more different dimensions. For example, as shown in FIG. 4B, the first friction inducing component 415 may have a first width, and the second friction inducing component may have a second width different than the first width. Varying the constructions and/or one or more dimensions of the friction inducing components may facilitate optimization of a desired COF or amount of coupling. Further, although two friction inducing components 415, 420 are illustrated in FIG. 4B, any other suitable number of friction inducing components may be utilized as desired.

FIG. 4C illustrates a longitudinal side view of a third example fiber optic ribbon stack 430. A first friction inducing component 435 may be helically wound or wrapped around the ribbon stack 430 along the longitudinal direction. Additionally, a second friction inducing component 440 may be helically wound or wrapped around the ribbon stack 430 along the longitudinal direction. As shown, the first and second friction inducing components 435, 440 may be helically wrapped in opposite directions. For example, the first component 435 may be wrapped in a clockwise direction while the second component 440 may be wrapped in a counter clockwise direction. As a result, the two components 435, 440 may overlap one another at any number of longitudinal spaced locations. Additionally, each of the friction inducing components 435, 440 may be wrapped with any suitable lay length. In certain embodiments, the two components 435, 440 may have lay lengths that are approximately equal to one another. In other embodiments, the two components 435, 440 may have different lay lengths. Additionally, as shown, each of the friction inducing components 435, 440 may be helically wrapped such that gaps or spaces are formed between longitudinally adjacent sections or wrappings.

Additionally, each of the friction inducing components 435, 440 may be formed with any suitable constructions and/or dimensions. In certain embodiments, the two components 435, 440 may have similar constructions and/or dimensions. In other embodiments, the two components may have different constructions and/or one or more different dimensions. Further, more than two friction inducing components may be utilized in other embodiments. Indeed, a wide variety of suitable arrangements and/or combinations of friction inducing components may be wrapped around a ribbon stack or other fiber optic ribbon assembly component as desired in various embodiments. The arrangements illustrated in FIGS. 4A-4C are provided by way of non-limiting example only.

Figure 5A:
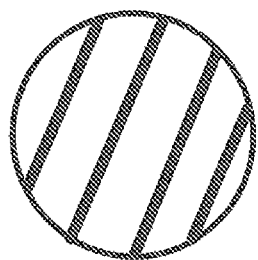
FIGS. 5A-5C are cross-sectional views of example friction inducing components that may be incorporated into fiber optic ribbon assemblies, according to illustrative embodiments of the disclosure.
Figure 5B:
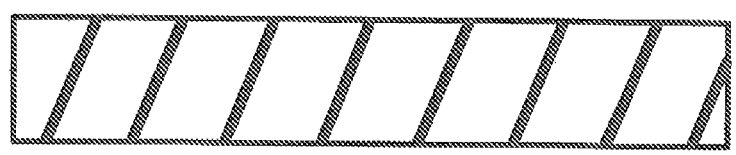
Figure 5C:
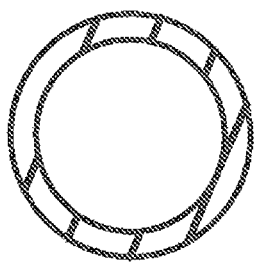

As explained in greater detail above with reference to FIG. 1, a friction inducing component (e.g., friction inducing component 120, etc.) may be formed with a wide variety of suitable constructions. FIGS. 5A-5C are cross-sectional views of example friction inducing components that may be incorporated into fiber optic ribbon assemblies. FIG. 5A illustrates an example friction inducing component 500 that is formed as a string, thread, or cord. The friction inducing component 500 may be formed with any suitable dimensions, such as any suitable diameter and/or cross-sectional area. Additionally, although the friction inducing component 500 is illustrated as having an approximately circular cross-sectional shape, the component 500 may be formed with any other suitable cross-sectional shape, such as an elliptical, rectangular, hexagonal, or octagonal cross-sectional shape. Further, the component 500 may be formed from any suitable materials and/or with any number of layers. For example, the component may be formed as a rubberized yarn or a string that is coated with friction inducing material.

FIG. 5B illustrates an example friction inducing component 505 that is formed as a tape or strip-like structure. The component 505 may be formed with any suitable dimensions, such as any suitable width and/or thickness. Additionally, the friction inducing component 505 may have any suitable cross-sectional shape, such as a rectangular cross-sectional shape. Further, the component 505 may be formed from any suitable materials and/or with any number of layers. For example, the component may be formed as relatively solid friction-inducing material, with friction inducing material embedded in a carrier layer, or with one or more friction inducing layers attached to a base layer.

FIG. 5C illustrates an example friction inducing component 510 that is formed as a tube or relatively hollow structure. The component 510 may be formed with any suitable dimensions, such as any suitable inner and/or outer diameters. Additionally, although the friction inducing component 510 is illustrated as having an approximately circular cross-sectional shape, the component 510 may be formed with any other suitable cross-sectional shape, such as an elliptical, rectangular, hexagonal, or octagonal cross-sectional shape. Further, although a single channel is illustrated in FIG. 5C as being formed through the component 510, a plurality of channels may be formed in other embodiments. For example, one or more suitable spokes, supports, dividers, or other structure may extend through an interior of the component 510 in either a longitudinally continuous manner or at any number of longitudinally spaced locations, thereby dividing an interior of the component 510 into a plurality of channels. Further, the component 510 may be formed from any suitable materials and/or with any number of layers. For example, the component may be formed as single layer rubber tubing, as a polymeric tube with embedded friction inducing material, or with a layer of friction inducing materials affixed to a base tube.

Figure 6A:
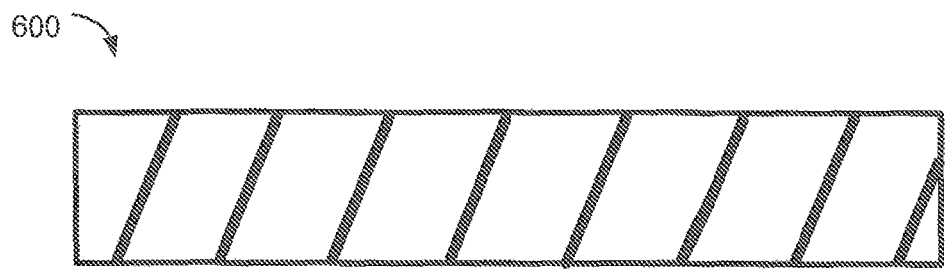
FIGS. 6A-6C are cross-sectional views of example layer constructions that may be utilized for various friction inducing components, according to illustrative embodiments of the disclosure.
Figure 6B:
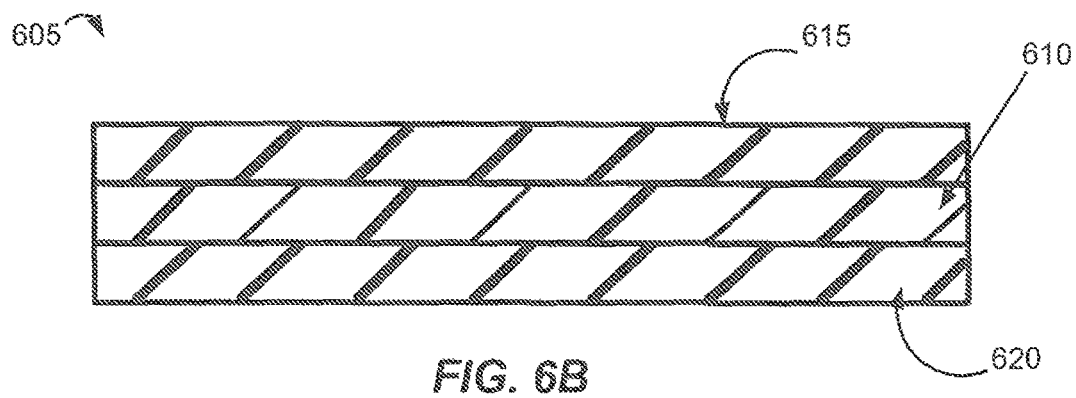
Figure 6C:
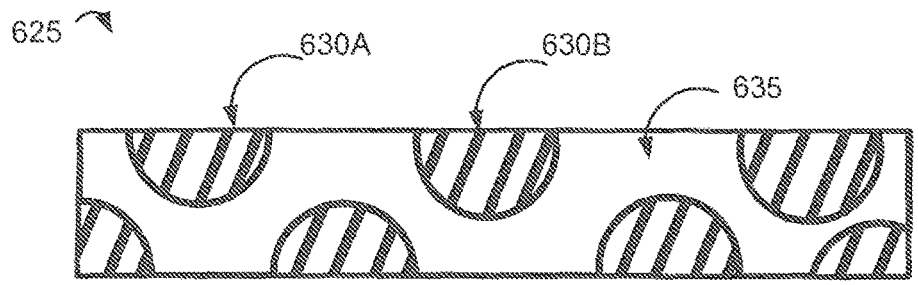

Regardless of the construction, cross-sectional shape, and/or dimensions of a friction inducing component, a friction inducing component may be formed with any number of suitable layers, materials, and/or combinations of materials. FIGS. 6A-6C are cross-sectional views of example layer constructions that may be utilized for various friction inducing components, such as any of the friction inducing components illustrated in FIGS. 1-5C. FIG. 6A illustrates an example construction 600 having a single layer of material. For example, a friction inducing component may be formed from a single layer of rubberized or other friction inducing material. FIG. 6I illustrates an example construction 605 having a plurality of layers of material. For example, a base layer 610 may be provided, and layers 615, 620 of friction inducing material may be adhered or otherwise affixed to opposite sides of the base layer 610. Such a construction may be utilized, for example, in conjunction with a friction inducing tape. In other embodiments, a single layer of friction inducing material may be affixed to one side of the base layer. For example, a base layer may be formed as a tube or a string, and a layer of friction inducing material may be affixed to an outer surface of the base layer. FIG. 6C illustrates an example construction 625 in which friction inducing material 630A, 630B is embedded into a base or carrier layer 635. In other embodiments, discrete components of friction inducing material may be adhered or otherwise affixed to an outer surface of a base or carrier layer. Indeed, a wide variety of suitable layer and/or material constructions may be utilized as desired to form a friction inducing component. The constructions described with reference to FIGS. 6A-6C are provided by way of non-limiting example only.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

That which is claimed:

1. A fiber optic ribbon assembly comprising:
   a buffer tube;
   an optical fiber ribbon stack extending within the buffer tube; and
   a friction inducing component helically wrapped around the optical fiber ribbon stack along a longitudinal direction with a lay length that results in the formation of longitudinal gaps between longitudinally adjacent helically wrappings of the friction inducing component, the friction inducing component having a Coefficient of Friction of at least approximately 0.40.

2. The assembly of claim 1, wherein the friction inducing component comprises one of a string, a tape, or a tube.

3. The assembly of claim 1, wherein the friction inducing component comprises an elastomeric material.

4. The assembly of claim 1, wherein the friction inducing component comprises rubber.

5. The assembly of claim 1, wherein the lay length of the friction inducing component is between approximately ten centimeters and approximately two meters.

6. The assembly of claim 1, further comprising a water blocking layer wrapped around the optical fiber ribbon stack.

7. The assembly of claim 6, wherein the friction inducing component is positioned between the water blocking layer and the buffer tube.

8. The assembly of claim 7, wherein the friction inducing component comprises a first friction inducing component, and further comprising:
   a second friction inducing component positioned between the optical fiber ribbon stack and the water swellable layer, the second friction inducing component helically wrapped around the optical fiber ribbon stack.

9. The assembly of claim 1, wherein the friction inducing component comprises a first friction inducing component, and further comprising:
   a second friction inducing component helically wrapped around the optical fiber ribbon stack.

10. The assembly of claim 9, wherein the first friction inducing component is helically wrapped in a first direction and the second friction inducing component is helically wrapped in a second direction different than the first direction.

11. A fiber optic ribbon assembly comprising:
    a buffer tube;
    an optical fiber ribbon stack extending within the buffer tube;
    a water blocking layer wrapped around the optical fiber ribbon stack; and
    a friction inducing component helically wrapped around the optical fiber ribbon stack along a longitudinal direction with a lay length that results in the formation of gaps between longitudinally adjacent helically wrappings of the friction inducing component, the friction inducing component having a Coefficient of Friction of at least approximately 0.40.

12. The assembly of claim 11, wherein the friction inducing component comprises one of a string, a tape, or a tube.

13. The assembly of claim 11, wherein the friction inducing component comprises at least one of an elastomeric material or rubber.

14. The assembly of claim 11, wherein the lay length of the friction inducing component is between approximately ten centimeters and approximately two meters.

15. The assembly of claim 11, wherein the friction inducing component is helically wrapped around the water blocking layer.

16. The assembly of claim 15, wherein the friction inducing component comprises a first friction inducing component, and further comprising:
    a second friction inducing component positioned between the optical fiber ribbon stack and the water blocking layer, the second friction inducing component helically wrapped around the optical fiber ribbon stack.

17. A cable comprising:
    an outer jacket defining a cable core;
    at least one buffer tube positioned within the cable core;
    an optical fiber ribbon stack extending within the buffer tube; and
    a friction inducing component helically wrapped around the optical fiber ribbon stack along a longitudinal direction with a lay length that results in the formation of gaps between longitudinally adjacent helical wrappings of the friction inducing component, the friction inducing component having a Coefficient of Friction of at least approximately 0.40.

18. The cable of claim 17, wherein the friction inducing component comprises one of a string, a tape, or a tube.

19. The cable of claim 17, wherein the friction inducing component comprises at least one of an elastomeric material or rubber.

20. The cable of claim 17, further comprising a water blocking layer wrapped around the optical fiber ribbon stack.

* * * * *